No. 728,322. PATENTED MAY 19, 1903.
C. P. STEINMETZ.
SYSTEM OF ELECTRICAL DISTRIBUTION.
APPLICATION FILED JAN. 2, 1901.
NO MODEL.

Witnesses.
John Ellis Glenn
Benjamin B. Hull

Inventor.
Charles P. Steinmetz
by Albert G. Davis
Atty.

No. 728,322. Patented May 19, 1903.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 728,322, dated May 19, 1903.

Application filed January 2, 1901. Serial No. 41,808. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, of which the following is a specification.

The invention herein set forth provides means whereby alternating current may be generated in the windings of a machine and converted into current of constant volume, which current may be consumed by suitable translating devices.

The invention in one of its various forms may be briefly described as comprising a multiphase generator of constant field excitation, across terminals of which is operatively connected a reactance device or devices, the effect of which causes an automatic transformation of induced electromotive force in the windings of the machine into an electromotive force which at the terminals of the machine varies in such a manner as to maintain a constant current in a consumption circuit or circuits fed thereby.

As to the precise features of novelty which constitute the invention reference is to be had to the claims appended hereto.

The invention may be embodied in a variety of different forms, some of which are illustrated in the accompanying drawings, in which—

Figure 1:
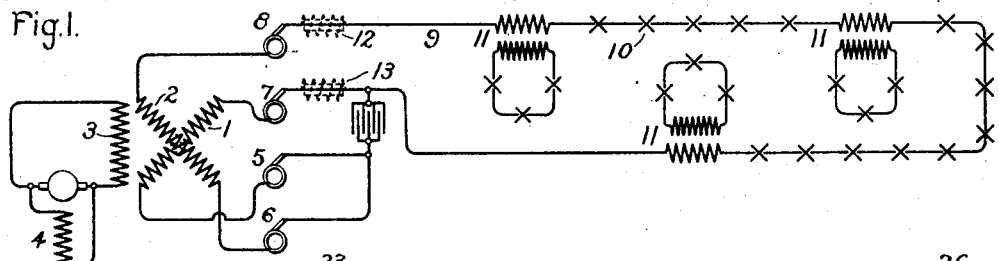
Figure 2:
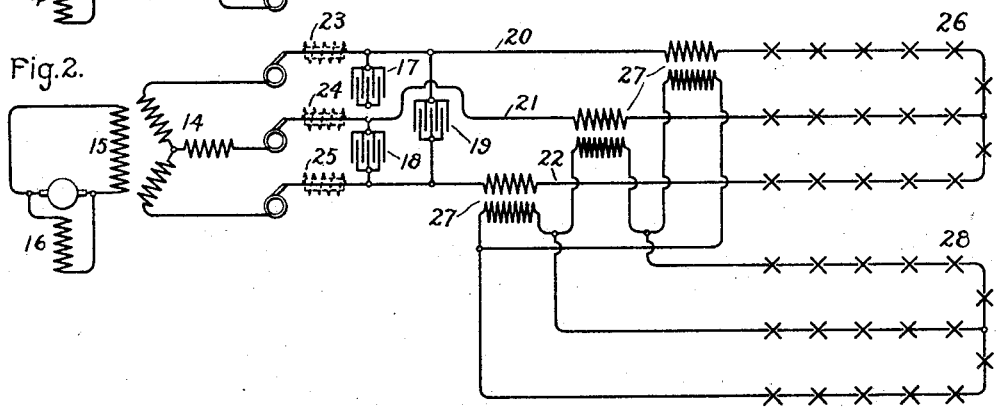
Figure 3:
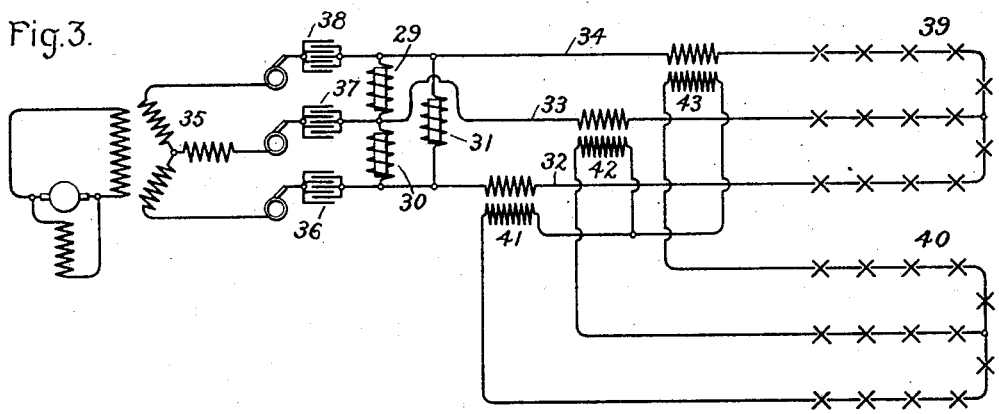
Figure 4:
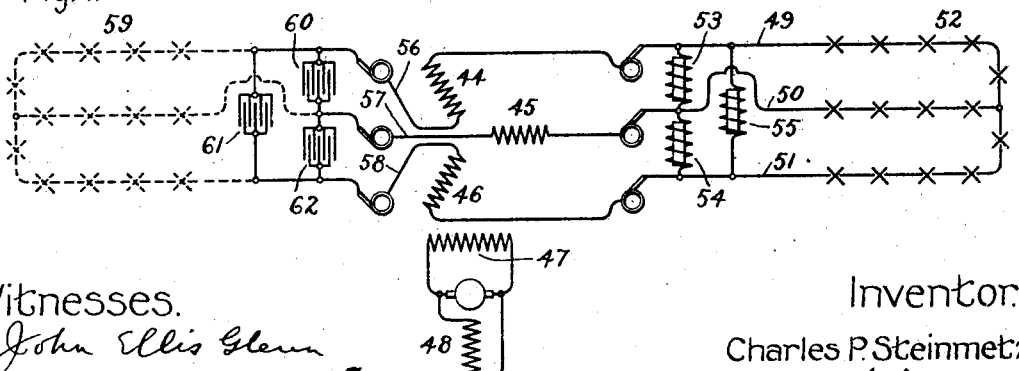

Figure 1 represents the application of the invention to a quarter-phase generator of the constant-potential type. Figs. 2 and 3 are slight modifications of the invention as applied to a three-phase generator, while Fig. 4 represents still another mode of converting three-phase current of constant induced electromotive force into current of constant volume.

In Fig. 1 the induced windings of the quarter-phase generator are represented conventionally at 1 and 2, respectively. The exciting-winding for the generator is represented at 3 and is supplied with a constant excitation from any suitable source, as from the exciter 4. The two phases of the quarter-phase machine, as represented by the windings 1 and 2, are connected in series with each other, as indicated by the joinder of the terminals 5 6, corresponding, respectively, to an end of each winding. The remaining terminals 7 and 8 are connected to a consumption-circuit, (represented at 9.) This consumption-circuit may include translating devices, such as 10, directly in series therewith, or current may be supplied to translating devices through transformers 11 of any desired ratio of transformation.

Across one phase of the machine—as, for example, that represented by the winding 1—I connect a condenser which has a reactance of a value equal to but of course opposite in effect from the synchronous reactance of the said winding 1. This synchronous reactance is an effective or equivalent reactance made up of two quantities, one of which is the self-induction proper of the winding 1, the other the effect of armature reaction upon the field of the machine. Since both of these quantities act to reduce the terminal voltage of the machine below that of the induced voltage with lagging current and to raise the voltage with leading current, their combined effect is equivalent to a reactance of certain value, which reactance I term the "synchronous reactance," because tis effect is felt only when the machine is in normal operation.

With a condenser, or for that matter any other device possessing the requisite capacity effect of the value described, connected across one of the phases of the quarter-phase machine. I have found that there results in a consumption-circuit connected to the machine a current constant in volume regardless of the load on the circuit.

In some cases the synchronous reactance of the quarter-phase winding may not be sufficient to give an economical value to the condenser required, in which case I may supplement the synchronous reactance by auxiliary inductance-coils in series, respectively, with each phase, these coils being indicated in Fig. 1 in dotted lines at 12 and 13. If the machine possesses high armature reaction, as is frequently the case, these additional inductance-coils will not be required.

In Fig. 2 I have shown the invention as applied to a generator of the three-phase type, the generator being shown in this instance as possessing generating-windings 14, connected in star or Y relation to each other. It is to be understood, however, that the coils may, if desired, be connected in delta relation without departing from the invention.

The field-winding of the three-phase machine is indicated conventionally at 15 and is constantly excited with direct current from the exciter 16 or from any other suitable source. Condensers 17, 18, and 19 are connected, respectively, across the mains 20, 21, and 22, extending from the terminals of the generator-windings. The condensers may, however, be connected to the mains in Y relation to each other. Each of these condensers is proportioned so that its reactance is equal to the synchronous reactance of one of the generator-windings. With this relative porportioning of parts the reaction of the leading current due to each condenser causes a rise in voltage upon increase in load on each of the mains 20, 21, and 22, this rise or variation of voltage being sufficient to maintain a constant current in the mains regardless of the loads thereon. As in the case shown in Fig. 1, if the synchronous reactance is insufficient to allow the use of condensers of economical size then the reactance may be supplemented by inductance-coils indicated in dotted lines, respectively, at 23, 24, and 25.

The Y or star connected consumption-circuits fed from the mains 20 21 22 include translating devices, either in series with the mains, as shown at 26, or inductively related to the mains through transformers 27, the secondaries of which are shown in this instance as delta-connected. Three Y-connected consumption-circuits fed from these secondaries are indicated generally at 28.

The arrangement shown in Fig. 3 differs principally from that shown in Fig. 2 in that the relation of condensers and inductances is reversed, the inductance-coils 29, 30, and 31 being represented as connected, respectively, across the several pairs of three-phase mains 32, 33, and 34, these inductance-coils reacting upon leading current produced by the generator-windings 35 through the instrumentality of condensers 36, 37, and 38, connected, respectively, in series with said windings. Y-connected consumption-circuits 39 are shown as connected directly to the mains 32, 33, and 34, and another set of Y-connected consumption-circuits 40 are connected to these main through series transformers, the secondaries 41 42 43 of which are Y-connected, as shown.

Fig. 4 shows still a different application of the invention. In this case, as in the preceding, the generator is of the three-phase type, provided with generating-windings, which, however, unlike the preceding, are connected neither in Y nor in delta relation to each other, but have the terminals of each winding free. These generating-windings are indicated, respectively, at 44, 45, and 46, and, as in the usual manner, are operatively related to the exciting-winding 47, supplied with direct current from the exciter 48 or any other suitable source of direct current. The outer terminals of each of the windings 44, 45, and 46 are connected to mains 49, 50, and 51, which are Y-connected to each other and operatively-related to translating devices 52, which in this case are shown as directly in series with the respective mains. Across each pair of the generator-terminals leading to the mains 49 50 51 is connected an inductance-coil, these coils being represented at 53 54 55. The inner ends 56 57 58 of the generator-windings are similarly joined to an alternative set of Y-connected consumption-circuits, (indicated in dotted lines at 59.) Each of these terminals, taken two and two, are connected by condensers represented, respectively, at 60 61 62. An inspection of the diagram as thus described will disclose each generating-winding in series both with an inductance-coil and a condenser. The condenser and inductance-coil corresponding to each winding are proportioned relatively to each other so as to have substantially equal reactances. Under these conditions there will be produced either at the respective terminals of each inductance-coil or of each condenser three sets of constant-current circuits. These sets may be consolidated by omitting the return-circuit of each, this being effected by means of the Y connection shown, this connection corresponding to the connections heretofore used in three-phase apparatus for consolidating the return-circuits of three distinct circuits in three-phase relation to each other. If desired, however, the consumption-circuits may be connected in delta relation.

Although I have described the invention as more particularly useful in connection with the generation of constant-potential electromotive forces and the derivation therefrom of current of constant value, it is to be understood that the reverse transformation may be made without departing from the spirit of the invention.

Wherever herein I speak of "reactances" I mean to include devices which possess the effect of capacity or inductance. For the purpose of illustration I have shown a condenser as typifying a device possessing capacity and an inductance-coil as typifying a device possessing inductance; but it will be evident to those skilled in the art that other devices possessing these same qualities may be employed—such, for example, as polarization-cells, transformers with open magnetic circuits, transformers with condensers in their secondaries, &c.

What I claim as new, and desire to secure by Letters Patent of the United States, is—

1. The combination of an alternating-current dynamo-electric machine, means for constantly exciting its field, a consumption-circuit of variable load or impedance fed from said machine, and means coöperating with the synchronous reactance of said machine to maintain a constant current in said consumption-circuit.

2. The combination of an alternating-current dynamo-electric machine, means for constantly exciting its field, a consumption-circuit operatively connected to said machine, and a reactance in shunt to terminals of said machine and coöperating with the reactance of said machine to maintain a constant current in said consumption-circuit.

3. The combination of an alternating-current dynamo-electric machine, means for constantly exciting its field, and means coöperating with the reactance of said machine for deriving from terminals thereof a current of varying electromotive force.

4. The combination of an alternating-current dynamo-electric machine, means for constantly exciting its field, and means coöperating with the synchronous reactance of said machine for deriving from terminals of said machine a constant current.

5. The combination of a multiphase alternating-current dynamo-electric machine, means for constantly exciting the field of the same, a reactance in shunt to one phase of said machine, and translating devices supplied with energy derived through the coöperation of all the phases of said machine.

6. The combination of a multiphase alternating-current dynamo-electric machine, means for constantly exciting the field of the same, a condenser in shunt to one phase of said machine, and translating devices supplied with energy derived through the coöperation of all the phases of said machine.

7. The combination of a multiphase alternating-current machine, a reactance in shunt to one phase of said machine, and a constant-current circuit supplied with energy derived through the coöperation of all the phases of said machine.

8. The combination of a multiphase alternating-current machine, a reactance in shunt to one phase of said machine, and a constant-current circuit connected in coöperative relation to all the phases of said machine.

9. The combination of a multiphase alternating-current machine, a reactance in shunt to one phase of said machine, and constant-current mains connected in coöperative relation to all the phases of said machine.

10. The combination of a multiphase alternating-current dynamo-electric machine, a condenser in shunt to a winding corresponding to one phase of said machine, said condenser being equal in reactance to the effective or synchronous reactance of said winding, and constant-current mains in coöperative relation to all the phases of said machine.

11. The combination of a multiphase alternating-current generator, a condenser in shunt to a generating-winding corresponding to one phase of said machine, said condenser being equal in reactance to the synchronous reactance of said winding, and translating devices connected so as to derive energy from said winding.

12. The combination of an alternating-current generator, a condenser in shunt to a generating-winding of said machine, said condenser being equal in reactance to the synchronous reactance of said winding, and translating devices arranged to receive energy from said winding.

13. The combination of a multiphase alternating-current dynamo-electric machine, means for constantly exciting the field of the same, a condenser in shunt to one phase of said machine, and a constant-current circuit or circuits fed from all of the phases of said machine.

14. The combination of a quarter-phase alternating-current dynamo-electric machine, a connection interlinking the quarter-phase windings in series, a condenser connected across one of said windings and a consumption-circuit connected to the free terminals of the windings.

15. The combination of a quarter-phase alternating-current dynamo-electric machine, a condenser connected across one phase, and a constant-current circuit fed from both phases in series.

16. The combination of a multiphase alternating-current generator, a consumption-circuit connected to terminals of said generator, and means in shunt to terminals of said generator for coöperating with the effective or synchronous reactance of the generating winding or windings to produce a constant current in said consumption-circuit.

17. The combination of a multiphase alternating-current generator, means for maintaining a constant field excitation for said generator, a consumption-circuit connected to terminals of said generator, and means in shunt to terminals of said generator for coöperating with the effective or synchronous reactance of the generating winding or windings to produce a constant current in said consumption-circuit.

In witness whereof I have hereunto set my hand this 29th day of December, 1900.

CHARLES P. STEINMETZ.

Witnesses:
BENJAMIN B. HULL,
MARGARET E. WOOLLEY.